United States Patent
Saito

(10) Patent No.: US 11,171,347 B2
(45) Date of Patent: Nov. 9, 2021

(54) FUEL CELL SYSTEM TO CONTROL OUTPUT OF A FUEL CELL STACK

(71) Applicant: Toyota Jidosha Kabushiki Kaisha, Toyota (JP)

(72) Inventor: Hiromu Saito, Toyota (JP)

(73) Assignee: TOYOTA JIDOSHA KABUSHIKI KAISHA, Toyota (JP)

(*) Notice: Subject to any disclaimer, the term of this patent is extended or adjusted under 35 U.S.C. 154(b) by 5 days.

(21) Appl. No.: 16/199,427

(22) Filed: Nov. 26, 2018

(65) Prior Publication Data

US 2019/0181472 A1 Jun. 13, 2019

(30) Foreign Application Priority Data

Dec. 7, 2017 (JP) .............................. JP2017-234916

(51) Int. Cl.

| | |
|---|---|
| *H01M 8/0438* | (2016.01) |
| *H01M 8/04089* | (2016.01) |
| *H01M 8/04537* | (2016.01) |
| *H01M 8/04082* | (2016.01) |
| *H01M 8/04119* | (2016.01) |
| *H01M 8/04746* | (2016.01) |

(52) U.S. Cl.
CPC ... *H01M 8/04388* (2013.01); *H01M 8/04089* (2013.01); *H01M 8/04104* (2013.01); *H01M 8/04164* (2013.01); *H01M 8/04201* (2013.01); *H01M 8/04552* (2013.01); *H01M 8/04619* (2013.01); *H01M 8/04753* (2013.01)

(58) Field of Classification Search
CPC ......... H01M 8/04388; H01M 8/04089; H01M 8/04619; H01M 8/04201; H01M 8/04164; H01M 8/04552; H01M 8/04753; H01M 8/04104

See application file for complete search history.

(56) References Cited

U.S. PATENT DOCUMENTS

| | | |
|---|---|---|
| 2008/0145730 A1 | 6/2008 | Takaki et al. |
| 2017/0250421 A1 | 8/2017 | Saito |

FOREIGN PATENT DOCUMENTS

| | | |
|---|---|---|
| CN | 101099255 A | 1/2008 |
| CN | 107123821 A | 9/2017 |
| DE | 102017103524 A1 | 8/2017 |
| JP | 2004259670 A | 9/2004 |
| JP | 2006196231 A | 7/2006 |

(Continued)

*Primary Examiner* — Milton I Cano
*Assistant Examiner* — Jenna Shulman
(74) *Attorney, Agent, or Firm* — Dinsmore & Shohl LLP

(57) ABSTRACT

A fuel cell system includes an anode gas flow passage in which an injector is disposed, a plurality of pressure sensors that measures a pressure value in the anode gas flow passage closer to the fuel cell stack than to the injector, and a control unit configured to control an output of the fuel cell stack by adjusting an amount of supplied anode gas using the measured pressure values. The control unit limits the output of the fuel cell stack when a first condition that a state in which a deviation, of a plurality of pressure values measured by the plurality of pressure sensors is equal to or greater than a predetermined first threshold value is maintained for a predetermined time or more has been satisfied compared with when the first condition has not been satisfied.

7 Claims, 5 Drawing Sheets

(56) References Cited

FOREIGN PATENT DOCUMENTS

| JP | 2007-121210 | A |   | 5/2007  |
|----|-------------|----|---|---------|
| JP | 2008210575  | A |   | 9/2008  |
| JP | 2010003527  | A | * | 1/2010  |
| JP | 6034328     | B2 |  | 11/2016 |
| JP | 2017-091625 | A |   | 5/2017  |

* cited by examiner

FUEL CELL SYSTEM TO CONTROL OUTPUT OF A FUEL CELL STACK

CROSS-REFERENCE TO RELATED APPLICATIONS

This application claims priority to Japanese Patent Application No. 2017-234916 filed on Dec. 7, 2017, which is incorporated herein by reference in its entirety including the specification, drawings and abstract.

BACKGROUND

1. Technical Field

The disclosure relates to a fuel cell system.

2. Description of Related Art

Japanese Unexamined Patent Application Publication No. 2017-91625 (JP 2017-91625 A) discloses a fuel cell system in which two injectors are disposed on a flow passage for supplying anode gas to a fuel cell, a pressure sensor is disposed in the flow passage downstream from the injectors, and the injectors are controlled using measurement values from the pressure sensor. In such a system, a phenomenon such as drift of the pressure sensor is detected using the measurement values from the pressure sensor when only one of the two injectors operates.

SUMMARY

When a phenomenon such as drift has occurred in a pressure sensor and an amount of supplied anode gas is adjusted by an injector using the measurement values from the pressure sensor, there is a likelihood that a problem will occur in a fuel cell system. Such a problem may occur even when a plurality of pressure sensors is disposed in the flow passage for anode gas downstream from the injector.

(1) According to an aspect of the disclosure, there is provided a fuel cell system including: a fuel cell stack that includes a plurality of cells; an injector that is disposed in an anode gas flow passage for supplying anode gas to the fuel cell stack; a plurality of pressure sensors that measures a plurality of pressure values in a portion of the anode gas flow passage closer to the fuel cell stack than to the injector; and a control unit configured to control an output of the fuel cell stack by adjusting an amount of anode gas supplied to the fuel cell stack by the injector using the measured plurality of pressure values, wherein the control unit is configured to limit the output of the fuel cell stack when a first condition that a state in which a deviation of the plurality of pressure values measured by the plurality of pressure sensors is equal to or greater than a predetermined first threshold value is maintained for a predetermined time or more has been satisfied compared with when the first condition has not been satisfied. When an amount of supplied anode gas is adjusted using a pressure value of a pressure sensor having a likelihood that an abnormality has occurred, there is a likelihood that the cells will deteriorate due to a shortage of anode gas or a likelihood that the pressure value of the anode gas flow passage downstream from the injector will be excessively high, due to an excess of anode gas. Accordingly, it is conceivable that supply of anode gas be stopped and the output of the fuel cell stack be stopped. According to this aspect, when the first condition has been satisfied, that is, when there is a likelihood that a sensor abnormality has occurred, the output of the fuel cell stack is limited and thus it is possible to prevent a problem which is caused by stopping the output of the fuel cell stack.

(2) The control unit may be configured to adjust the amount of anode gas supplied to the fuel cell stack by the injector using the highest pressure value of the plurality of pressure values when the first condition has been satisfied. According to this configuration, since an amount of supplied anode gas is adjusted using the highest pressure value of the plurality of pressure values, it is possible to prevent the pressure value of the anode gas flow passage downstream from the injector from becoming excessively high.

(3) The anode gas flow passage may include a discharge flow passage in which anode off-gas discharged from the fuel cell stack flows, a discharge valve that discharges water and anode off-gas discharged from the fuel cell stack to the outside of the fuel cell system when a second condition has been satisfied may be provided in the discharge flow passage, the fuel cell system may further include a dilution gas supply unit configured to supply dilution gas for diluting the anode off-gas discharged from the discharge valve, and the control unit may be configured to control the dilution gas supply unit such that an amount of supplied dilution gas increases as the plurality of pressure values measured by the plurality of pressure sensors increase when the second condition has been satisfied, and to control the dilution gas supply unit using the highest pressure value of the plurality of pressure values when the first condition and the second condition have been satisfied. According to this configuration, since a cathode gas supply unit is controlled using the highest pressure value of the plurality of pressure values, it is possible to prevent the concentration of anode gas in the anode off-gas discharged to the outside of the fuel cell system via the discharge valve from becoming excessively high.

(4) The fuel cell system may further include a voltage measuring unit configured to measure a cell voltage in the fuel cell stack, the control unit may be configured to limit the output of the fuel cell stack when the cell voltage becomes lower than a predetermined threshold voltage and to increase the predetermined threshold voltage when the deviation has satisfied the first condition. According to this configuration, when the first condition that there is a likelihood that an abnormality has occurred in the pressure sensor has been satisfied, the threshold voltage for limiting the output of the fuel cell stack is increased and the output of the fuel cell stack is limited when the cell voltage is lower than the threshold voltage. Accordingly, it is possible to curb problems which are caused by stopping the output of the fuel cell stack. When the first condition has been satisfied and the cell voltage is equal to or higher than the threshold voltage, the output can be performed in the same way as when the first condition has not been satisfied and thus it is possible to curb problems which are caused by stopping the output of the fuel cell stack.

The present disclosure can be embodied in various forms, and can be embodied, for example, in the forms of a method of controlling a fuel cell system, a method of controlling a fuel-cell vehicle, a computer program for realizing the control methods, and a non-transitory storage medium having the computer program recorded thereon.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

First Embodiment

Figure 1:
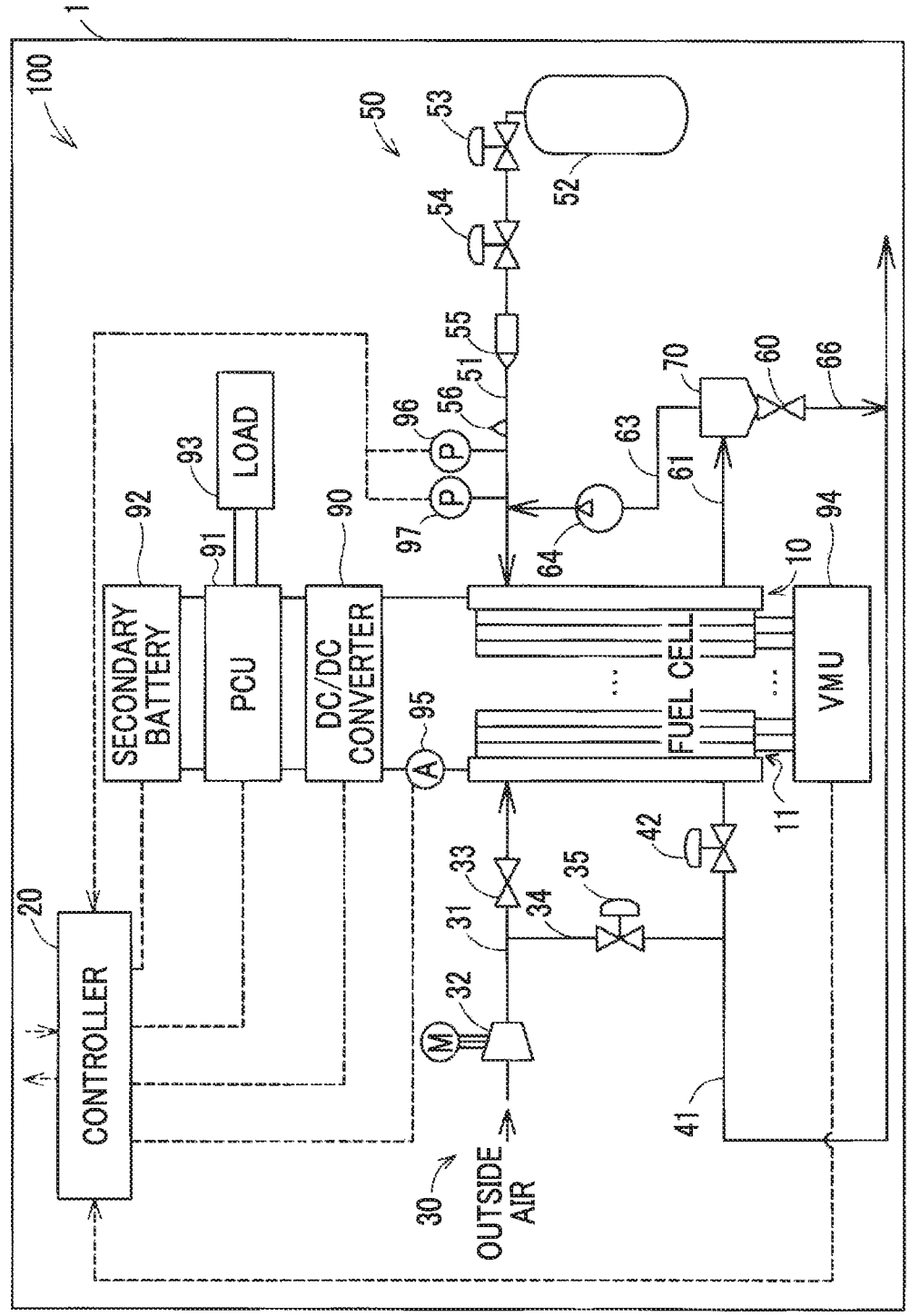
FIG. 1 is a diagram schematically illustrating a configuration of a fuel cell system.

FIG. 1 is a diagram schematically illustrating a configuration of a fuel cell system 100. The fuel cell system 100 is mounted in a vehicle 1 and outputs electric power serving as a power source of the vehicle in response to a request from a driver.

The fuel cell system 100 includes a fuel cell stack 10, a control unit 20, a cathode gas supply/discharge system 30, and an anode gas supply/discharge system 50.

The fuel cell system 100 further includes a DC/DC converter 90, a power control unit (hereinafter referred to as a "PCU") 91, a secondary battery 92, and a load 93.

The fuel cell stack 10 has a configuration in which a plurality of cells 11 is stacked. Each cell of the plurality of cells 11 includes a membrane-electrode assembly in which electrodes are disposed on both surfaces of an electrolyte membrane and a set of separators that pinches the membrane-electrode assembly therebetween, and generates electric power with supply of anode gas (for example, hydrogen) and cathode gas (for example, air) as reactant gases.

The cathode gas supply/discharge system 30 includes a cathode gas pipe 31, a cathode gas compressor 32, a first ON/OFF valve 33, a cathode off-gas pipe 41, a first regulator 42, a bypass pipe 34, and a bypass valve 35, The cathode gas compressor 32 is connected to the fuel cell stack 10 via the cathode gas pipe 31. The cathode gas compressor 32 compresses air taken in from the outside in accordance with a control signal from the control unit 20 and supplies the compressed air as cathode gas to the fuel cell stack 10. The first ON/OFF valve 33 is disposed in the cathode gas pipe 31 between the cathode gas compressor 32 and the fuel cell stack 10.

The cathode off-gas pipe 41 discharges cathode off-gas discharged from the fuel cell stack 10 or cathode gas flowing from the bypass pipe 34 to the outside of the fuel cell system 100. The first regulator 42 adjusts a cathode gas outlet pressure of the fuel cell stack 10 in accordance with a control signal from the control unit 20.

The bypass pipe 34 connects the cathode gas pipe 31 to a portion of the cathode off-gas pipe 41 closer to the fuel cell stack 10 than to a discharge pipe 66. The bypass valve 35 is disposed in the bypass pipe 34 and adjusts a flow rate of cathode gas flowing from the cathode gas pipe 31 to the cathode off-gas pipe 41 in accordance with a control signal from the control unit 20.

The anode gas supply/discharge system 50 includes an anode gas pipe 51, an anode gas tank 52, a second ON/OFF valve 53, a second regulator 54, an injector 55, a relief valve 56, a discharge valve 60, an anode off-gas pipe 61, a circulation pipe 63, an anode gas pump 64, and a gas-liquid separator 70. A flow passage for anode gas which is constituted by the anode gas pipe 51, the fuel cell stack 10, the anode off-gas pipe 61, the gas-liquid separator 70, and the circulation pipe 63 is referred to as an "anode gas flow passage."

The anode gas pipe 51 is a pipe for supplying anode gas to the fuel cell stack 10. The anode gas tank 52 is connected to an anode gas inlet manifold of the fuel cell stack 10 via the anode gas pipe 51, and supplies anode gas filled therein to the fuel cell stack 10. The second ON/OFF valve 53, the second regulator 54, the injector 55, and the relief valve 56 are arranged in the anode gas pipe 51 from upstream, that is, from the side close to the anode gas tank 52, in this order. The second ON/OFF valve 53 is opened and closed in accordance with a control signal from the control unit 20. When the fuel cell system 100 is stopped, the second ON/OFF valve 53 is closed. The second regulator 54 adjusts the pressure of anode gas upstream from the injector 55 in accordance with a control signal from the control unit 20.

A plurality of pressure sensors which are of the same type is provided downstream from the injector 55 in the anode gas flow passage. In this embodiment, two pressure sensors (a first pressure sensor 96 and a second pressure sensor 97) are provided in the anode gas pipe 51 downstream from the injector 55 and upstream from a position connected to the circulation pipe 63. The first pressure sensor 96 and the second pressure sensor 97 measure the pressure value downstream from the injector 55. The measurement results (measured pressure values) of the first pressure sensor 96 and the second pressure sensor 97 are transmitted to the control unit 20.

The injector 55 is an ON/OFF valve that is electromagnetically driven depending on a drive cycle or a valve opening time which, is set by the control unit 20 and is a device that adjusts an amount of anode gas supplied to the fuel cell stack 10. The control unit 20 executes anode gas supply control of adjusting an amount of anode gas supplied from the injector 55 using the measurement values (the pressure values) of the first pressure sensor 96 and the second pressure sensor 97. Specifically, the control unit 20 controls the drive cycle or the valve opening time of the injector 55 and controls an amount of anode gas supplied to the fuel cell stack 10 such that the pressure value downstream from the injector 55 is not less than a target pressure value. The target pressure value is determined depending on electric power required for the fuel cell stack 10. For example, when the target pressure value is 150 kPa and the pressure values of the first pressure sensor 96 and the second pressure sensor 97 are 130 kPa, the control unit 20 controls the injector 55 such that the pressure values of the first pressure sensor 96 and the second pressure sensor 97 become 150 kPa.

When the pressure value downstream from the injector 55 is equal to or greater than a predetermined second threshold value, the relief valve 56 is opened and anode gas is discharged from the anode gas pipe 51. In another embodiment, the relief valve 56 may not be provided in the anode gas pipe 51.

The anode off-gas pipe 61 connects an anode off-gas outlet manifold of the fuel cell stack 10 to the gas-liquid separator 70. The anode off-gas pipe 61 is a pipe for discharging anode off-gas from the fuel cell stack 10 and guides anode gas which has not been used for a power generation reaction or anode off-gas including nitrogen gas to the gas-liquid separator 70. The anode off-gas pipe 61 is also referred to as a "discharge flow passage."

The gas-liquid separator 70 is connected between the anode off-gas pipe 61 and the circulation pipe 63. The gas-liquid separator 70 separates water from anode off-gas in the anode off-gas pipe 61 and stores the separated water.

The discharge valve 60 is an ON/OFF valve that is disposed in the anode off-gas pipe 61 and is provided below the gas-liquid separator 70 in this embodiment. The discharge valve 60 discharges water and anode off-gas discharged from the fuel cell stack 10 to the outside of the fuel cell system 100. Water and anode off-gas discharged from the discharge valve 60 flow into the cathode off-gas pipe 41 via the discharge pipe 66, and are discharged to the outside of the fuel cell system 100 by the energy of cathode off-gas. Anode off-gas discharged from the discharge valve 60 is discharged to the outside with the concentration thereof reduced by cathode off-gas. The control unit 20 opens the discharge valve 60 when a predetermined valve opening condition has been satisfied, and closes the discharge valve 60 when a predetermined valve closing condition has been satisfied. The valve opening condition is also referred to as a "second condition." The valve opening condition is a condition that an amount of water stored in the gas-liquid separator 70 has reached a prescribed value or a condition that a nitrogen concentration downstream from the injector 55 has reached a prescribed value. The valve closing condition is a condition that a predetermined time has elapsed after the discharge valve 60 has been opened, a condition that the amount of stored water has become less than the prescribed value, or a condition that the nitrogen concentration has become less than the prescribed value. The control unit 20 may estimate an amount of water generated by power generation in the fuel cell stack 10 based on an amount of power generated by the fuel cell stack 10 and determine whether the amount of water stored in the gas-liquid separator 70 has reached the prescribed value. Whether the amount of water stored in the gas-liquid separator 70 has reached the prescribed value or whether the amount of stored water has become less than the prescribed value may be determined based on a measurement result from a water gauge disposed in the gas-liquid separator 70.

Whether the nitrogen concentration has reached the prescribed value or whether the nitrogen concentration has become less than the prescribed value may be determined based on a measurement result from a nitrogen concentration meter disposed in the anode gas flow passage downstream from the injector 55.

The circulation pipe 63 is a pipe that connects the gas-liquid separator 70 to a position in the anode gas pipe 51 downstream from the injector 55. The anode gas pump 64 that is driven in accordance with a control signal from the control unit 20 is provided in the circulation pipe 63. Anode off-gas from which water has been separated by the gas-liquid separator 70 is sent to the anode gas pipe 51 by the anode gas pump 64. In the fuel cell system 100, a utilization efficiency of anode gas is enhanced by circulating anode off-gas including anode gas and supplying the anode off-gas to the fuel cell stack 10 again.

The DC/DC converter 90 steps up a voltage output from the fuel cell stack 10 and supplies the stepped-up voltage to the PCU 91 under the control of the control unit 20. The PCU 91 has an inverter built thereinto and controls the load 93 via the inverter in accordance with a control signal from the control unit 20. Electric power generated by the fuel cell stack 10 is stored in the secondary battery 92 via the DC/DC converter 90 and the PCU 91. The electric power of the fuel cell stack 10 and the secondary battery 92 is supplied to the load 93 such as a traction motor (not illustrated) for driving vehicle wheels (not illustrated), the cathode gas compressor 32, the anode gas pump 64, and various valves via a power supply circuit including the PCU 91. The PCU 91 limits a current in the fuel cell stack 10 under the control of the control unit 20.

A voltage measuring unit (VMU) 94 measures a cell voltage Vc which is a voltage for each cell of the plurality of cells 11 of the fuel cell stack 10. The voltage measuring unit 94 may measure voltages of the individual cells 11 of the fuel cell stack 10, or may connect the cells 11 as cell groups including n cells as a group (where n is an integer equal to or greater than 1) and measure the sum of the voltages of the cells 11 for each cell group. When n is equal to or greater than 2, the cell voltage can be calculated by dividing the measured voltage by n. The voltage measuring unit 94 transmits the cell voltage Vc to the control unit 20. A current measuring unit 95 measures a current value of the fuel cell stack 10. The current measuring unit 95 transmits the measurement result to the control unit 20.

The control unit 20 is constituted as a computer including a CPU, a memory, and an interface circuit to which the above-mentioned components are connected. By executing a control program stored in the memory, the control unit 20 controls the output of the fuel cell stack 10 by adjusting an amount of anode gas supplied from the injector 55 such that the pressure value of the anode gas flow passage downstream from the injector 55 is not less than the target pressure value. The control unit 20 executes control of power generation in the fuel cell system 100 and realizes a routine of an output limiting process which will be described later by controlling the units of the fuel cell system 100.

Figure 2:
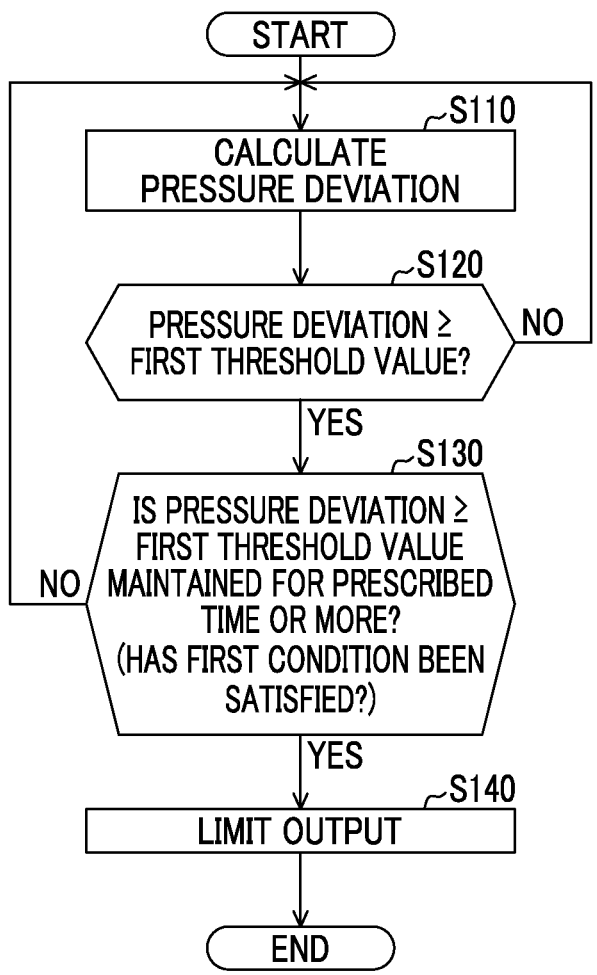
FIG. 2 is a flowchart illustrating a routine of an output limiting process.

FIG. 2 is a flowchart illustrating a routine of an output limiting process which is performed by the control unit 20. The control unit 20 starts this process routine when supply of electric power to a plurality of pressure sensors is started. When this process routine is started, the measurement results from the plurality of pressure sensors is sequentially transmitted to the control unit 20.

First, the control unit 20 calculates a pressure deviation (Step S110). The pressure deviation in this embodiment is an absolute value of a difference in measurement value between the plurality of pressure sensors. The pressure deviation is calculated at predetermined time intervals while performing this process routine. In this embodiment, when the sensors operate normally, the measurement values from the plurality of pressure sensors have almost the same value. The measurement value may be, for example, 100 kPa under atmospheric pressure. When the measurement value is offset from an actual pressure value, has a constant value which is different from an actual pressure value, or increases or decreases gradually from an actual pressure value for a certain reason, the pressure deviation can increase.

The control unit 20 determines whether the pressure deviation is equal to or greater than a predetermined first threshold value (Step S120). The first threshold value can be determined in consideration of a normal pressure value of the anode gas flow passage downstream from the injector 55, a second threshold value which is a pressure value when the relief valve 56 is opened, a sensor error derived from a pressure sensor, or the like.

When the pressure deviation is equal to or greater than the first threshold value (YES in Step S120), the control unit 20 determines whether a state in which the pressure deviation is equal to or greater than the first threshold value has been maintained for a predetermined time (a prescribed time) or more (Step S130). The condition of Step S130 is also referred to as a "first condition." The first condition is a condition that there is a likelihood that a problem will occur in the fuel cell system 100 if one pressure value is randomly selected from the pressure values of the plurality of pressure sensors to control the fuel cell system 100 when the first condition has been satisfied. When the first condition has been satisfied, this represents that there is a likelihood that a sensor abnormality will occur.

When the pressure deviation is less than the first threshold value (NO in Step S120), the control unit 20 returns the process routine to Step S110. When the state in which the pressure deviation is equal to or greater than the first threshold value is not maintained for the prescribed time or more, that is, when the pressure deviation is less than the first threshold value until the prescribed time elapses after the pressure deviation becomes equal to or greater than the first threshold value (NO in Step S130), the control unit 20 returns the process routine to Step S110.

When the first condition has been satisfied (YES in Step S130), the control unit 20 executes output limiting (Step S140). The process of Step S140 is a process of limiting the output current from the fuel cell stack 10 when the first condition has been satisfied to a greater extent than when the first condition has not been satisfied. The control unit 20 executes output limiting with reference to a degree of output limiting when the first condition has been satisfied, which is stored in the memory.

In this embodiment, the control unit 20 executes the output limiting using the cell voltage Vc which is acquired from the voltage measuring unit 94. Limiting of the output using the cell voltage Vc is to decrease a likelihood that the cells 11 will deteriorate and thus power generation performance will decrease when the cell voltage Vc decreases and becomes, for example, a negative voltage.

Figure 3:
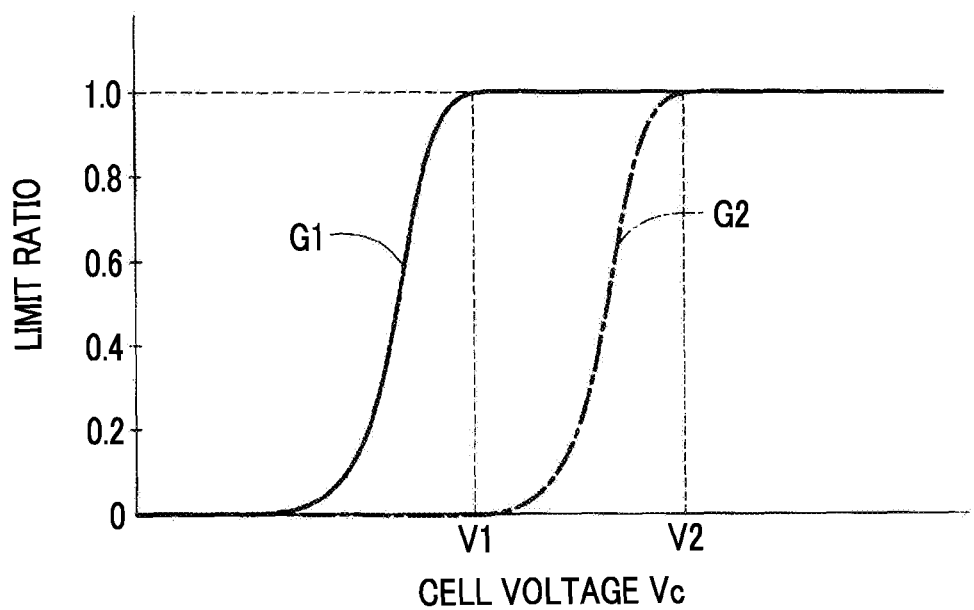
FIG. 3 is a diagram illustrating a relationship between a cell voltage and a limit ratio.

FIG. 3 is a diagram illustrating a relationship between the cell voltage Vc and a limit ratio. Graph G1 represents a relationship between the cell voltage Vc and the limit ratio when the first condition has not been satisfied, and Graph G2 represents a relationship between the cell voltage Vc and the limit ratio when the first condition, has been satisfied. Limit ratio of 1.0 means that the output is not limited, and Limit ratio of 0 means that the output is not performed. In this embodiment, the control unit 20 executes the output limiting when a minimum value of the cell voltage Vc is lower than a predetermined threshold voltage, and sets the threshold voltage to be higher when the first condition has been satisfied than when the first condition has not been satisfied. Specifically, when the first condition has not been satisfied, the control unit 20 executes the output limiting when the cell voltage Vc is lower than the threshold voltage V1 as represented by Graph G1. When the first condition has been satisfied (YES in Step S130 of FIG. 2), the control unit 20 sets the threshold voltage to a threshold voltage V2 which is higher than the threshold voltage V1 when the first condition has not been satisfied, and executes the output limiting when the cell voltage Vc becomes lower than the threshold voltage V2. The control unit 20 instructs the PCU 91 to limit the output current value using the limit ratio calculated from the voltage value. The PCU 91 limits the current of the fuel cell stack 10 in accordance with the instruction from the control unit 20.

When an amount of supplied anode gas is adjusted using the pressure value of a pressure sensor with a likelihood that an abnormality has occurred, there is a likelihood that a problem in that the cells deteriorate due to a shortage of anode gas will occur or that the pressure value of the anode gas flow passage downstream from the injector 55 will become excessively high due to an excess of anode gas. Accordingly, it is conceivable that supply of anode gas be stopped and the output from the fuel cell stack 10 be stopped. However, when the output from the fuel cell stack 10 is stopped, there is a likelihood that a problem in that operation of the units of the fuel cell system 100 will stop or the vehicle 1 including the fuel cell system 100 will stop will occur. When an insufficient output is supplemented by the output of the secondary battery 92, an amount of power remaining in the secondary battery 92 decreases and thus there is a likelihood that a problem in that operation of the units of the fuel cell system 100 will stop or the vehicle 1 including the fuel cell system 100 will stop will occur.

According to this embodiment, when the first condition that the state in which the pressure deviation is equal to or greater than the first threshold value is maintained for the prescribed time or more has been satisfied, that is, when there is a likelihood that a sensor abnormality has occurred, the output of the fuel cell stack 10 is limited and it is thus possible to prevent a problem which is caused by stopping the output from the fuel cell stack 10.

According to this embodiment, when the first condition has been satisfied, the threshold voltage for limiting the output of the fuel cell stack 10 is increased and the output of the fuel cell stack 10 is limited when the cell voltage Vc becomes lower than the threshold voltage V2. Accordingly, it is possible to prevent a problem which is caused by stopping the output from the fuel cell stack 10. When the first condition has been satisfied and the cell voltage Vc is equal to or greater than the threshold voltage V2, the output can be performed in the same way as when the first condition has not been satisfied and thus it is possible to prevent a problem which is caused by limiting the output of the fuel cell stack 10.

Second Embodiment

Figure 4:
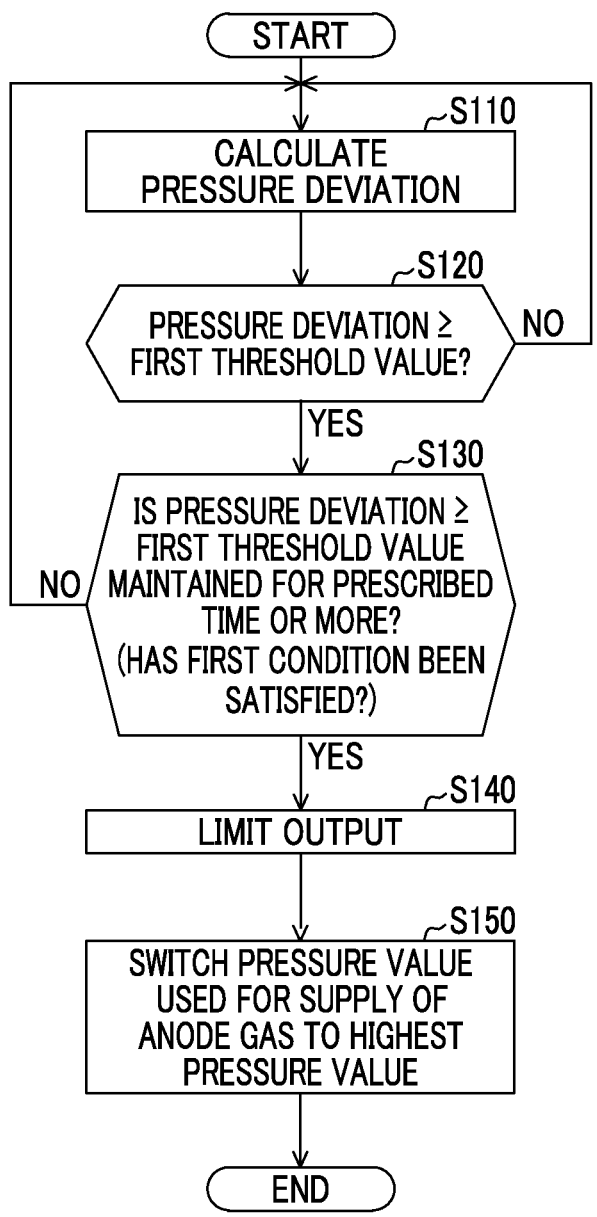
FIG. 4 is a flowchart illustrating a routine of an output limiting process according to a second embodiment.

A difference from the first embodiment will be described below. FIG. 4 is a flowchart illustrating a routine of an output limiting process according to the second embodiment. In the second embodiment, when the first condition has been satisfied (YES in Step S130), the control unit 20 executes the output limiting (Step S140) and switches the pressure value which is used for anode gas supply control to the highest pressure value (Step S150) in addition to execution of the output limiting (Step S140). That is, when the first condition has been satisfied, the control unit 20 adjusts an amount of anode gas supplied from the injector 55 to the fuel cell stack 10 using the highest pressure value of a plurality of pressure values which are measured by a plurality of pressure sensors. For example, when the measurement value from the first pressure sensor 96 is 130 kPa, the measurement value from the second pressure sensor 97 is 150 kPa, and the target pressure value is 160 kPa, the control unit 20 adjusts an amount of anode gas supplied from the injector 55 such that the measurement value from the second pressure sensor 97 becomes 160 kPa.

According to this embodiment, since an amount of supplied anode gas is adjusted using the highest pressure value of a plurality of pressure values, it is possible to prevent the pressure value of the anode gas flow passage downstream from the injector 55 from becoming excessively high.

According to this embodiment, since the pressure value of the anode gas flow passage downstream from the injector 55 can be prevented from becoming excessively high, it is possible to prevent opening of the relief valve 56 and to prevent anode gas from being discharged to the outside of the fuel cell system 100.

Third Embodiment

A difference from the first and second embodiments will be described below. In a third embodiment, the control unit 20 execute dilution gas supply control of diluting anode off-gas discharged from the discharge valve 60 when the second condition which is a valve opening condition of the discharge valve 60 has been satisfied. "Diluting anode off-gas" means that the concentration of anode off-gas is decreased. Decreasing of the concentration of anode off-gas is also to decrease the concentration of anode gas in the anode off-gas. The control unit 20 controls the cathode gas supply/discharge system 30 such that an amount of supplied dilution gas which is cathode off-gas discharged from the fuel cell stack 10 and flowing in the cathode off-gas pipe 41 or cathode gas flowing into the cathode off-gas pipe 41 from the bypass pipe 34 is determined, and causes the determined amount of dilution gas to flow into the cathode off-gas pipe 41. The cathode gas supply/discharge system 30 is also referred to as a "dilution gas supply unit." The control unit 20 estimates that an amount of discharged anode gas increases as the pressure value measured by a pressure sensor increases, controls the cathode gas supply/discharge system 30 such that the amount of supplied dilution gas increases, and causes the dilution gas to flow. Specifically, a relationship between the pressure value downstream from the injector 55 and the amount of supplied dilution gas is stored in the memory of the control unit 20, and the control unit 20 determines a dilution gas flow rate using the pressure value acquired from the pressure sensor and the relationship. This relationship is obtained by experiment or simulation such that the anode gas concentration in anode off-gas discharged from the discharge valve 60 is lower than a concentration which is determined by the law by supply of dilution gas.

Figure 5:
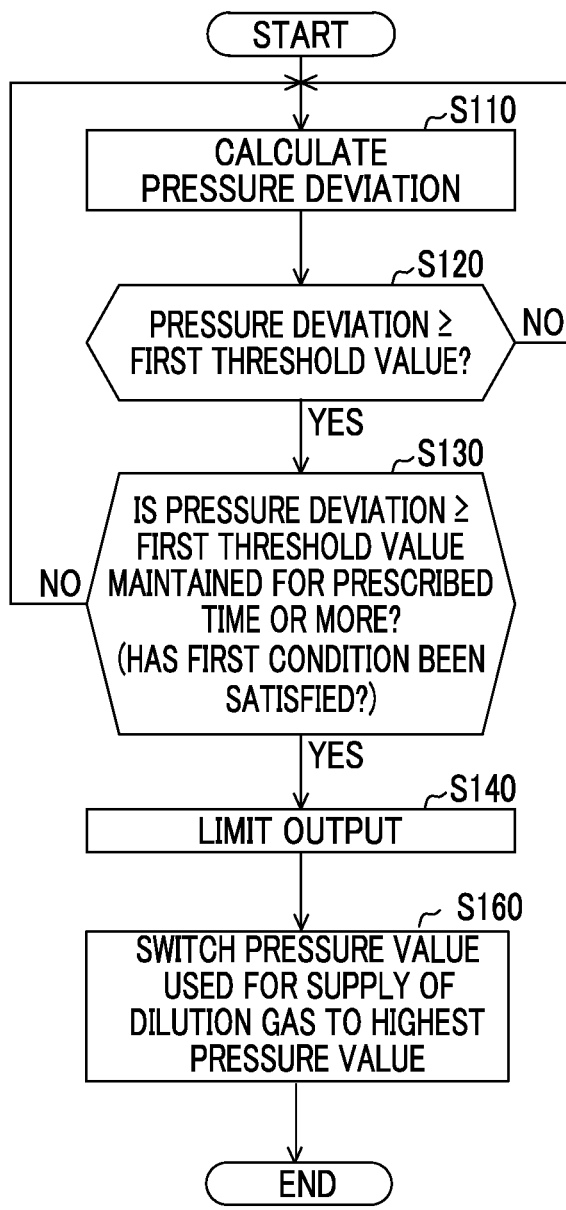
FIG. 5 is a flowchart illustrating a routine of an output limiting process according to a third embodiment.

FIG. 5 is a flowchart illustrating a routine of an output limiting process according to the third embodiment. In the third embodiment, when the first condition has been satisfied (YES in Step S130), the control unit 20 executes the output limiting (Step S140) and switches the pressure value which is used for dilution gas supply control to the highest pressure value (Step S160) in addition to execution of the output limiting (Step S140). That is, when the first condition and the second condition have been satisfied, the control unit 20 controls the cathode gas supply/discharge system 30 using the highest pressure value of the pressure values which are measured by a plurality of pressure sensors.

According to this embodiment, it is possible to prevent the anode gas concentration in anode off-gas discharged from the discharge valve 60 to the outside of the fuel cell system 100 from becoming excessively high.

Fourth Embodiment

When the first condition has been satisfied, the control unit 20 may decrease the amount of supplied anode gas by setting the valve opening time per unit time of the injector 55 to a first valve opening, time corresponding to, for example, the smallest output among the outputs of the fuel cell stack 10 with which there is no problem in the fuel cell system 100 and which is calculated in advance by experiment. When the first condition has been satisfied, the control unit 20 may execute output limiting by controlling the valve opening time of the injector 55 such that it becomes the first valve opening time.

Fifth Embodiment

A plurality of pressure sensors is disposed in the anode gas flow passage downstream from the injector 55, but may be disposed at different positions in the anode gas pipe 51. When the pressure sensors are disposed in the anode gas pipe 51 and the anode off-gas pipe 61, the control unit 20 may compare a measurement value from the pressure sensor disposed in the anode gas pipe 51 with a value obtained by converting an amount of anode gas consumed in the fuel cell stack 10 into a pressure value and adding the converted pressure value to the measurement value from the pressure sensor disposed in the anode off-gas pipe 61, and calculate the pressure deviation. The anode gas flow passage may include the anode gas inlet manifold or the anode off-gas outlet manifold of the fuel cell stack 10, and the pressure sensors may be disposed in the anode gas inlet manifold or the anode off-gas outlet manifold.

Sixth Embodiment

In the above-mentioned embodiments, the number of pressure sensors is two, but the number of pressure sensors may be equal to or greater than three. The deviation in this specification includes both the absolute value of a deviation in a normal sense and the absolute value of a difference. When the number of pressure sensors is equal to or greater than three, the absolute value of a difference between the value of the pressure sensor having measured the largest value and the value of the pressure sensor having measured the smallest value may be used as the deviation. It may be determined whether the absolute value of a difference between the average value of the values of the plurality of pressure sensors and the value of the pressure sensor having measured the largest value or the smallest value is equal to or greater than a "predetermined first threshold value."

Seventh Embodiment

In the third embodiment, the control unit 20 may acquire a pressure difference between the pressure value of the anode gas flow passage downstream from the injector 55 and a measured pressure from an outside air pressure sensor disposed in the fuel cell system 100 and determine an amount of supplied dilution gas using a relationship between the pressure difference between the pressure value of the anode gas flow passage downstream from the injector 55 and the outside air pressure and the amount of supplied dilution gas.

Eighth Embodiment

The control unit 20 may store a measurement value when disconnection has occurred in a signal line or a power supply line connected to the pressure sensor in the memory thereof. When the measurement value when disconnection has occurred in the signal line or the power supply line is detected, the control unit 20 may not use the measurement value for calculation of the pressure deviation.

Ninth Embodiment

When the state in which the pressure deviation is equal to or greater than the first threshold value is maintained for the prescribed time or more (YES in Step S130), the control unit 20 may notify a user that the first condition has been satisfied, that is, that there is a likelihood that a sensor abnormality has occurred using an alarm device that emits voice or light or a display device on which characters or the like are displayed, which are included in the fuel cell system 100.

Tenth Embodiment

The fuel cell system 100 may not be mounted in the vehicle 1 but may be of a stationary type. The fuel cell system 100 may be configured to acquire information such as the first threshold value or the prescribed time by cloud communication or may perform various determinations using the acquired information. The vehicle 1 may be a connected car in which a communication unit is mounted.

Eleventh Embodiment

The above-mentioned embodiments may be appropriately combined. For example, the second embodiment and the third embodiment may be combined.

This disclosure is not limited to the above-mentioned embodiments, and can be embodied in various forms without departing from the gist thereof. For example, embodiments corresponding to the technical features in the aspects described in the SUMMARY and technical features of other embodiments can be appropriately substituted or combined in order to solve some or all of the above-mentioned problems or to achieve some or all of the above-mentioned advantageous effects.

What is claimed is:

1. A fuel cell system comprising:
   a fuel cell stack that includes a plurality of cells;
   an injector that is disposed in an anode gas flow passage for supplying anode gas to the fuel cell stack;
   a first pressure sensor that measures a first pressure value in a portion of the anode gas flow passage, the portion of the anode gas flow passage being closer to the fuel cell stack than to the injector;
   a second pressure sensor that measures a second pressure value in the portion of the anode gas flow passage closer to the fuel cell stack than to the injector; and
   a control unit configured to control an output of the fuel cell stack by adjusting an amount of anode gas supplied to the fuel cell stack by the injector using the measured first pressure value and the measured second pressure value,
   wherein the control unit is configured to limit the output of the fuel cell stack by a power control unit when a first condition that a state in which an absolute value of a difference between the first pressure value and the second pressure value is equal to or greater than a predetermined first threshold value is maintained for a predetermined time or more has been satisfied compared with when the first condition has not been satisfied.

2. The fuel cell system according to claim 1, wherein the control unit is configured to adjust the amount of anode gas supplied to the fuel cell stack by the injector using the highest pressure value of the first pressure value and the second pressure value when the first condition has been satisfied.

3. The fuel cell system according to claim 1, wherein the anode gas flow passage includes a discharge flow passage in which anode off-gas discharged from the fuel cell stack flows,
   wherein a discharge valve that discharges water and anode off-gas discharged from the fuel cell stack to the outside of the fuel cell system when a second condition has been satisfied is provided in the discharge flow passage,
   wherein the fuel cell system further comprises a dilution gas supply unit configured to supply dilution gas for diluting the anode off-gas discharged from the discharge valve, and
   wherein the control unit is configured
      to control the dilution gas supply unit such that an amount of supplied dilution gas increases as the first pressure value measured by the first pressure sensor and the second pressure value measured by the second pressure sensor increase when the second condition has been satisfied, and
      to control the dilution gas supply unit using the highest pressure value of the first pressure value and the second pressure value when the first condition and the second condition have been satisfied.

4. The fuel cell system according to claim 3, further comprising a gas-liquid separator that is disposed in the discharge flow passage,
   wherein the second condition is at least one of whether an amount of water stored in the gas-liquid separator has reached a prescribed value and whether a nitrogen concentration downstream from the injector has reached a prescribed value.

5. The fuel cell system according to claim 1, further comprising a voltage measuring unit configured to measure a cell voltage in the fuel cell stack,
   wherein the control unit is configured
      to limit the output of the fuel cell stack when the cell voltage becomes lower than a predetermined threshold voltage, and
      to increase the predetermined threshold voltage when the deviation has satisfied the first condition.

6. The fuel cell system according to claim 1, wherein the control unit is configured to limit the output of the fuel cell stack when a minimum value of a cell voltage among the plurality of cells is lower than a predetermined threshold voltage.

7. The fuel cell system according to claim 6, wherein the control unit is configured to increase the predetermined threshold voltage when the first condition has been satisfied, compared with when the first condition has not been satisfied.

* * * * *